(12) United States Patent
Knox et al.

(10) Patent No.: US 7,869,407 B2
(45) Date of Patent: Jan. 11, 2011

(54) WIRELESS ROUTER AND SOFTWARE

(75) Inventors: Frank John Knox, Peabody, MA (US); Jeffery Jacques, Londonderry, NH (US); Michael Larson, Goffstown, NH (US)

(73) Assignee: Edge Velocity Corporation, Salem, NH (US)

( * ) Notice: Subject to any disclaimer, the term of this patent is extended or adjusted under 35 U.S.C. 154(b) by 1092 days.

(21) Appl. No.: 11/600,007

(22) Filed: Nov. 15, 2006

(65) Prior Publication Data

US 2007/0225019 A1    Sep. 27, 2007

Related U.S. Application Data

(60) Provisional application No. 60/784,157, filed on Mar. 21, 2006.

(51) Int. Cl.
*H04W 4/00* (2009.01)
*H04W 36/00* (2009.01)

(52) U.S. Cl. .................. 370/331; 370/332; 370/333; 455/436; 455/437; 455/438; 455/439

(58) Field of Classification Search ......... 370/331–333; 455/436–439
See application file for complete search history.

(56) References Cited

U.S. PATENT DOCUMENTS 7,545,782 B2    6/2009  Rayment et al.
7,586,879 B2    9/2009  Chari et al.

OTHER PUBLICATIONS

Ramani, et al.; "SyncScan: Practical Fast Handoff for 802.11 Infrastructure Networks;" Department of Computer Science & Engineering, University of California, San Diego, dated Mar. 13-17, 2005; pp. 675-684.

Mishra, et al.; "An Empirical Analysis of the IEEE 802.11 MAC Layer Handoff Process;" Department of Computer Science, University of Maryland, dated Apr. 2003; pp. 93-102.

"Wi4 Mesh;" Motorola USA; www.motorola.com/Business/US-EN/Product+Lines/MOTOwi4/ch.wi4+Mesh.print; Jun. 2006.

Brik, et al; "Eliminating handoff latencies in 802.11 WLANs using Multiple Radios: Applications, Experience, and Evaluation;" Jan. 2005; 6 pages.

*Primary Examiner*—Nick Corsaro
*Assistant Examiner*—Huy C Ho
(74) *Attorney, Agent, or Firm*—Daly, Crowley, Mofford & Durkee, LLP

(57) ABSTRACT

A broadband wireless network includes intelligent base stations and mobile units. The network includes control means to manage connectivity of the mobile units to the intelligent base stations. Software is provided to control connection of the mobile unit to an intelligent base station having preferred signal characteristics. When a mobile unit connects to an intelligent base station, the software broadcasts corrected routing information to all intelligent base stations on the network allowing persistent wireless connectivity.

16 Claims, 3 Drawing Sheets

WIRELESS ROUTER AND SOFTWARE

PRIORITY AND RELATED APPLICATIONS

The present application claims priority benefit of U.S. Provisional Application Ser. No. U.S. 60/784,157 filed Mar. 21, 2006 and entitled "Wireless Router and Software", which is incorporated herein by reference in its entirety.

FIELD OF THE INVENTION

The present invention relates to hardware and software for broadband wireless communications. In particular, a router and operating software for a reliable, secure, high bandwidth mobile IP network for communication of voice, video, and data are disclosed. The present technology enables internet based applications to run in a high-speed mobile environment and function as if they were on a traditional, stationary, wired network and was designed with a layered self-healing router to enhance optimum performance.

BACKGROUND OF THE INVENTION

The Internet Protocol (IP) is the most successful network layer protocol in computing due to its many strengths. But, as network technology matures, some weaknesses became apparent. At the time IP was developed, the requirement for the Internet was to allow hundreds of large, stationary computers to share data. Today, we have millions of mobile notebook computers, Personal Data Assistants (PDA's) and cell phones which use wireless networking to connect to the wired network, albeit at very low speeds. The time for providing full speed, full functionality IP capabilities for truly mobile IP devices has come. To support IP in a mobile environment, a new protocol, Mobile IP, was developed.

Our present mobile IP broadband wireless solution differs from existing solutions.

Canopy systems (Motorola, Tropos):

Canopy systems are designed for a metropolitan area network where an acceptable wired infrastructure does not exist. They were not designed for high-speed mobile vehicles. You can roam in a 16 KM radius, but you cannot seamlessly roam from one canopy network to another.

Satellite/cellular (Icomera, PointShot Wireless):

Intended for mobile IP systems, however, does not have the bandwidth to make it a viable solution for many IP applications. These solutions utilize cellular technologies: GSM (150 Kbps), GPRS (170 Kbps), 3G (384 Kbps) theoretical maximum throughput. In practice the throughput on satellite/cellular systems is much lower, often as low as 50 Kbps. The EDGE Velocity solution currently supports a minimum of 23 Mbps, a 60× increase in throughput. Satellite communications are notorious for not being the most stable and reliable.

Broadband Over Third-rail (Powerline networking) Powerline networking techniques are used to provide network infrastructure for these mass transit vehicles. This type of network only works for electric trains, buses and trolleys.

Enhanced Wi-Fi Networking

Wireless Local Area Network (WLAN) radio technology is specified in the Institute of Electrical and Electronics Engineers (IEEE) 802.11 series of standards. Systems are designed to offer bandwidths of up to 54 Mb/s and provide limited mobility across small, typically indoor cells of 50 to 100 m radius. WLAN is not a truly mobile system, as it does not include the high-speed handover mechanisms associated with mobile radio.

BRIEF SUMMARY OF THE INVENTION

We have now conceived and developed a reliable, secure, high bandwidth mobile IP network for communication of voice, video, and data. The network comprises: at least two intelligent base stations, each intelligent base station having a unique ESSID and a unique MAC address, at least one mobile device adapted to communicate with said intelligent base stations, each mobile device having a unique MAC address; and means for controlling the communications between said intelligent base stations and said mobile devices. The means for controlling communications between said intelligent base stations and said mobile devices include: means for transmitting routing information including a MAC address from said mobile device to said intelligent base station, and means for transmitting routing information from any one of said at least one intelligent base station to each other said at least one intelligent base station on the network.

In the network the mobile device can be a modem connected to a computer, which may serve as a server for a sub-network, a PDA, a computer, or a cellular phone.

The network can include a plurality of mobile devices and a plurality of intelligent base stations. The network may include other IP addressable devices.

The mobile devices include means for determining the signal strength of a signal from intelligent base stations in the network and means for comparing the signal strength of the signal from two or more intelligent base stations in the network.

The means for transmitting routing information from said mobile device to said intelligent base station include the step of communicating the MAC of the mobile device to the intelligent base station.

Software operating on the mobile device performs the following steps:
a.) determining the signal strength of a signal from each intelligent base station in the network at a mobile device and identifying the intelligent base station having the strongest signal at the mobile device;
b.) determining the saturation of the signal of each intelligent base station in communication with said mobile device;
c.) determining the preferred connection between said mobile device and one of said intelligent base stations based on the signal strength of the signal from the intelligent base station and the saturation of the intelligent base station.
d.) Updating the address resolution protocol cache and broadcasting the routing information to each intelligent base station in the network; and
e.) Periodically scanning available signals from intelligent base stations within the network to determine whether the signal strength and saturation of the signals from a different intelligent base station have changed to make the second intelligent base station the preferred connection;
f.) Connecting to the second intelligent base station; and
g.) Updating the address resolution protocol cache and IP broadcasting the routing information to each intelligent base station on the network.

DETAILED DESCRIPTION OF AN ILLUSTRATIVE EMBODIMENT

A router and operating software for a reliable, secure, high bandwidth mobile IP network for communication of voice, video, and data are disclosed. The present technology enables internet based applications to run in a high-speed mobile environment and function as if they were on a traditional, stationary, wired network and was designed with a layered self-healing router to enhance optimum performance.

Figure 1:
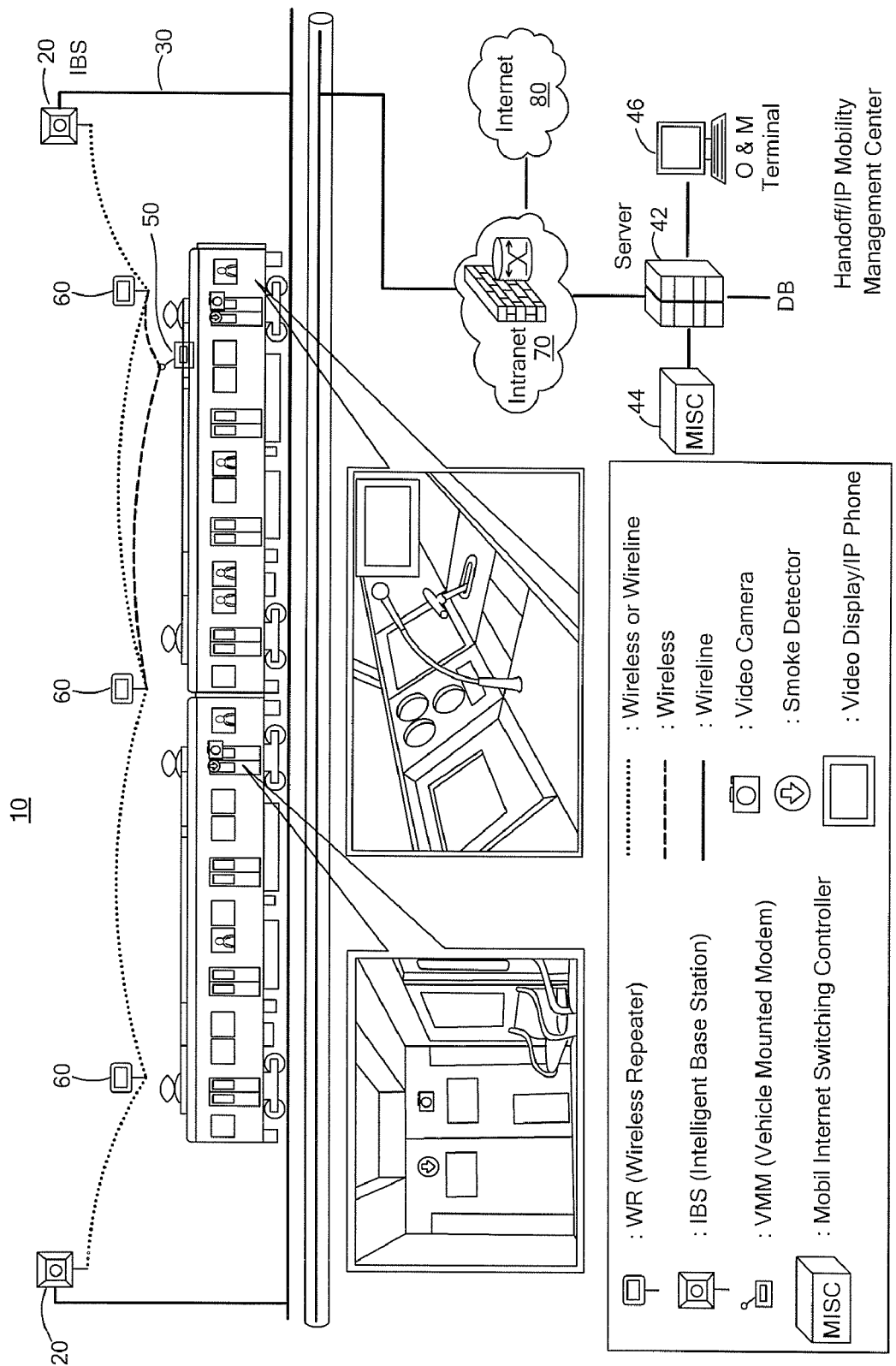
FIG. 1 is an illustration of one embodiment of a network according to the present invention.

FIG. 1 illustrates one embodiment of a network utilizing the features that we have now discovered. The network 10 includes a plurality of intelligent base stations 20 connected by a network 30 to a handoff/mobility management center 40. The network may include other computers, servers, input, output, and storage devices and interfaces with other networks. The intelligent base stations 20 are in wireless communication with mobile unit 50, optionally through wireless repeaters 60. In this embodiment, three layers of IP networks are shown: the network within the train can be a wireless or wired network connected to the mobile unit 50; the network between the mobile unit 50 on the train and the intelligent base stations 20, which may be a direct wireless connection, or a connection through wireless repeaters 60; and the communications between the handoff/IP mobility management center 40 and the public internet 80 which occurs through firewall 70.

The network comprises: at least two intelligent base stations 20 each intelligent base station having a unique ESSID and a unique MAC address, at least one mobile device 50 adapted to communicate with said intelligent base stations, each mobile device having a unique MAC address; and means for controlling the communications between said intelligent base stations and said mobile devices in the handoff/IP mobility management center 40. The means for controlling communications between said intelligent base stations and said mobile devices include: means for transmitting routing information including a MAC address from said mobile device to said intelligent base station, and means for transmitting routing information from any one of said at least one intelligent base station to each other said at least one intelligent base station on the network.

An intelligent base station 20 can be stationary, mounted on a tower or a rooftop. In one embodiment, the intelligent base station is at least about 10 to 50 feet above the surrounding ground level. In some cases, the intelligent base station device can also be temporarily mounted on a building or a tower brought to a location where added wireless broadband capacity is desired. For example, an edge device may be mounted on one or more ladder or other towers on fire fighting apparatus.

In use, the intelligent base station 20 performs the functions of authenticating, authorizing, and auditing IP traffic and routing that traffic to the intended recipient. The intelligent base station 20 also has capability to identify the location of transient mobile devices 50 within its operational range. The intelligent base station 20 wirelessly connects with mobile units using OFDM multiplexing that allows high bandwidth communication. In use the intelligent base station 20 connects the mobile device 50 to its ultimate destination on the network using a VPN.

The intelligent base station 20 includes a plurality of wireless cards or radios and a Commell LE370 motherboard with PCI riser or equivalent parts. Using two radios allows the intelligent base stations 20 to interconnect or mesh. Wireless transmission to and from the mobile device uses one radio and communication with other intelligent base stations related to network control occurs on the second radio. The intelligent base station includes a CPU and memory to control the communication with the mobile units and the mesh communication. The intelligent base station 20 includes at least one antenna for transmitting information to the mobile devices in the network. The antenna may be an omni directional antenna, a parabolic antenna for directional communication, or a specialized device such as a Leaky feeder for use in subterranean environments.

The intelligent base station 20 communicates to the handoff/IP mobility management center 40 over network 10. Optionally, Intelligent base stations can communicate with each other wirelessly.

The mobile device 50 can be attached to a PDA carried by ground personnel or securely mounted within a vehicle (car, bus, train or plane). The mobile device may connect to local client computers via 10/100/1000tx Ethernet, and may serve as a router for a sub-network within the vehicle. The mobile device 50 is designed to maintain connectivity with the intelligent base stations 20 while traveling at speeds in excess of 80 miles per hour (129 KPH), and 1.5 miles (2.4 km) below the surface of the earth. The mobile device 50 can have multiple functions. For example, the mobile device 50 may serve as a hub or hot spot for local devices with either an Ethernet or a conventional wireless (WPA) connection. Additionally, the mobile device 50 maintains a record of the address routing table for the network that can be transmitted to the intelligent base stations 20 of the network to maintain connectivity with the network Typically a mobile device will include a low power CPU. An x86 compatible CPU with a processing speed of at least about 1 GHz has been used. Intel Pentium M and VIA Eden CPU's have been used in tests. Preferably the front side bus of the CPU should be 400 MHz. The device should include sufficient RAM. Test equipment had up to 1 GB DDR SDRAM.

These components should be on a low voltage motherboard able to operate on 12 V DC, or through power over Ethernet. The chipset should be well supported by LINUX. The motherboard should also have a CF slot that can be set as the IDE master. The device should include a number of Ethernet and USB ports to allow for additional components or network devices to be connected with the mobile device. In particular, 2 or 3 Ethernet 10/100/1000Base T ports can be advantageously used. The device should include a hardware watchdog with available LINUX drivers.

Although the mobile device 50 can track up to 8 intelligent base stations 20 simultaneously, it communicates to one intelligent base station 20 at a time. It has the capability of allowing users to transition from one network to another, via a 'handoff' between intelligent base stations 20a and 20b and not drop its communications link. Conceptually, it is similar to ability of cell phones to stay connected as you drive down the highway.

Figure 2:
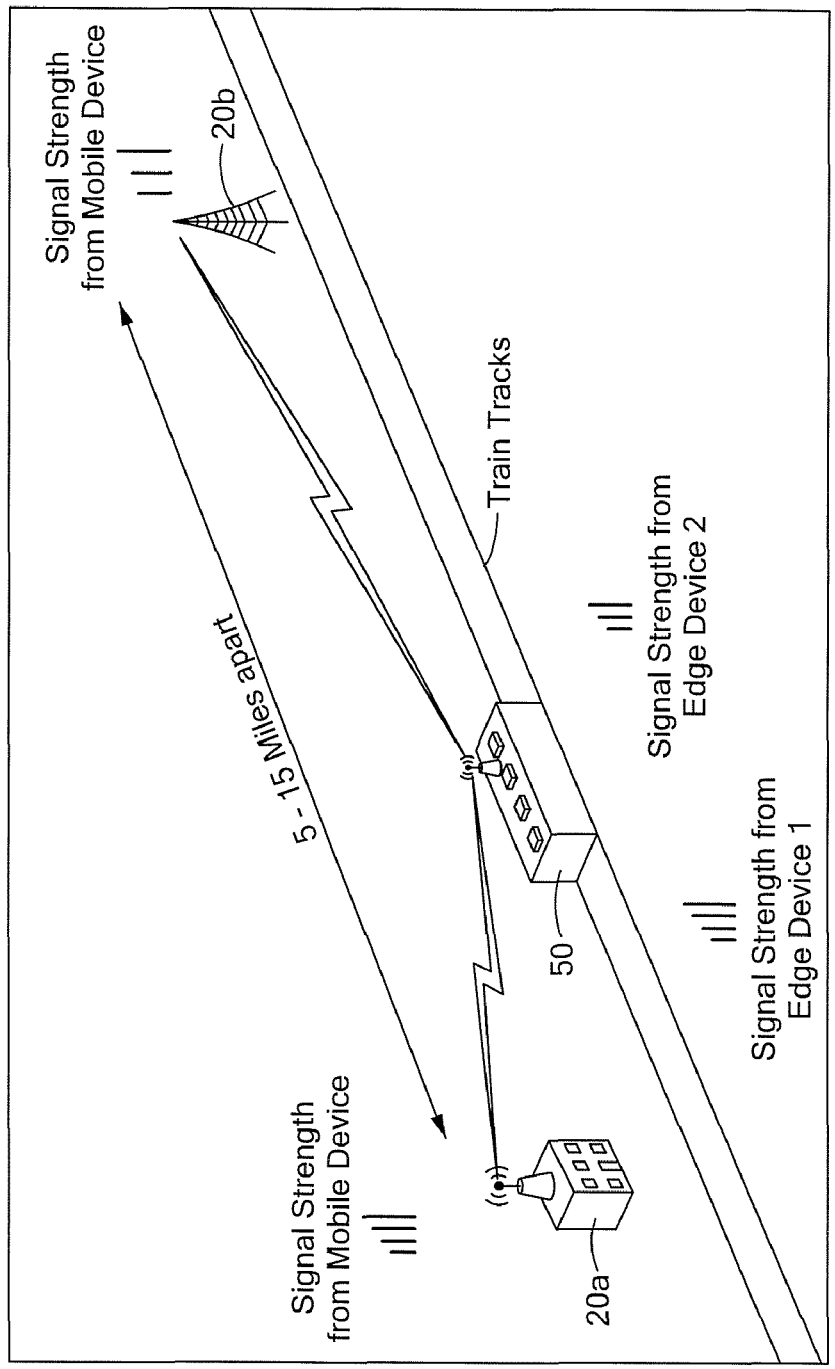
FIGS. 2 and 3 illustrate transition of communication from one intelligent base station to another intelligent base station in the network as the mobile device moves between two intelligent base stations.
Figure 3:
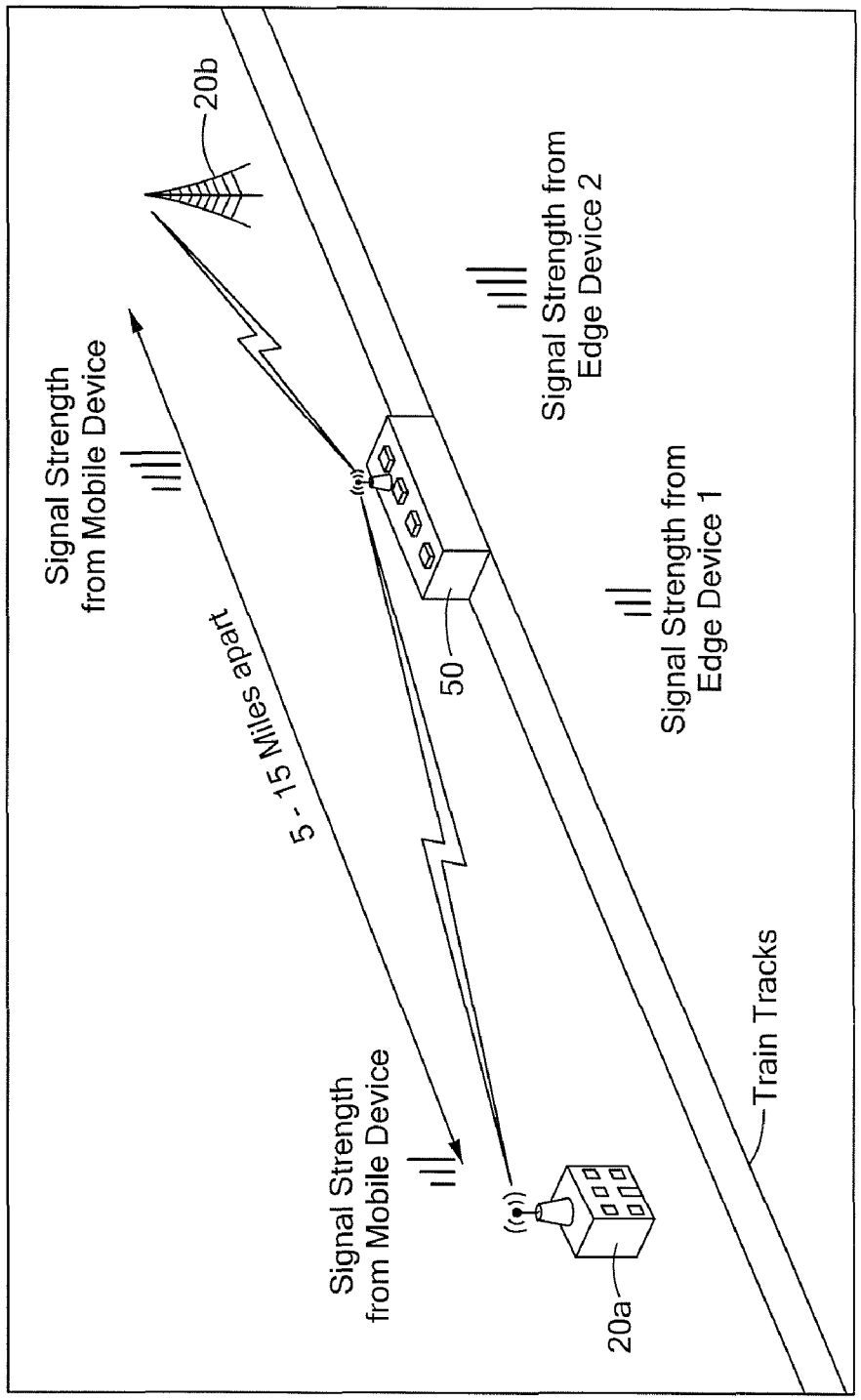

FIGS. 2 and 3 illustrate the handoff of communication from on intelligent base station 20a to another intelligent base station 20b.

The software that controls switching between intelligent base stations 20 is below:

```perl
#!/usr/bin/perl

This program parses the important information from "iwlist athX scanning",
determines the strongest cell and it's MAC address, and switches cells.

Globals
use POSIX qw(setsid);
use vars qw/ %opt %current_cell /;
$ENV{'PATH'} = '/usr/local/sbin:/usr/sbin:/sbin:/usr/local/bin:/usr/bin:';
# "wlan0 No scan results"
Command line options processing
sub init( ){
    use Getopt::Std;
    my $opt_string = 'bdhave:s:t:';
    getopts("$opt_string", \%opt) or usage( );
    usage( ) if $opt{h};
    usage( ) unless $opt{e};
}
Message about this program and how to use it
sub usage( ){
print STDERR << "EOF";
This program parses the important information from "iwlist ath0 scanning",
determines the strongest cell and it's MAC address, and switches cells.
v 0.920
usage: $0 [-bdhav] [-e essid] [-s seconds] [-t number]
-h         : this (help) message
-b         : run in daemon mode
-d         : debug message stuff
-v         : verbose output
-e ESSID   : valid ESSID to connect to *** Required ***
-s seconds : value of sleep( ) to slow down script
-t number  : threshold in dBm (default 0)
EOF
    exit;
}
detach from current terminal and display output on tty2
sub daemon( ){
    fork ( ) && exit 0;
    setsid ( );
    open (STDOUT, "> /dev/vc/2") || die "Can't redirect STDOUT to $!\n";
    open (STDERR, "> /dev/tty2") || die "Can't redirect STDOUT to $!\n";
}
parse the important information from iwlist
return an array of hashes representing each cell
sub scan_cells( ){
    my @cells_scanned;
    my ($cell_number, $mac_address, $essid, $signal_level);
    print "--> Scanning cells...\n" if $opt{v};
    foreach ('iwlist ath1 scanning') {
        # pull the important data out of iwlist
        #use vars qw/ $cell_number $mac_address $essid $signal_level
/;
        if (/Cell (\d{2})/) {
            $cell_number = $1;
            print "$cell_number \t" if $opt{d};
        }
        if (/Address: (\w{2}:\w{2}:\w{2}:\w{2}:\w{2}:\w{2})/) {
            $mac_address = $1;
            print "$mac_address \t" if $opt{d};
        }
        if (/ESSID:\"(\w*)\"/) {
            $essid= $1;
            print "$essid \t" if $opt{d};
        }
        if (/Signal level. (.?\d+)/) {
            $signal_level= $1;
            print "$signal_level \n" if $opt{d};
            push @cells_scanned, {
                signal_level    => $signal_level,
                essid           => $essid,
                mac_address     => $mac_address,
                cell_number     => $cell_number,
            };
        }
    }
    unless ($signal_level && $mac_address && $cell_number) {
        return 0;
    }
#   $died_value = $? >> 8;
#   print "$died_value failed to scan: $!\n";
    if ($opt{v}) {
        # output the parsed list of cells found
        foreach (@cells_scanned) {
            print "\t", $_->{cell_number}, "\t";
            print $_->{mac_address}, "\t";
            print $_->{essid}, "\t";
            print $_->{signal_level}, "\n";
        }
    }
    return (@cells_scanned);
}
determine the strongest signal and return the correct MAC address
expects argument consisting of a single array of hashes
sub strongest_signal ( ){
    my $check_scan = $_[0];
    if ($check_scan eq 0){
        print "* Error reading scan data or no cells available\n" if $opt{v};
        return 0;
    }
    my @cells_scanned = @_;
    my (%potential_cell, $mac_address);
    my ($cell, $cell_signal_level, $potential_cell_signal_level, $cell_mac_address);
    my $threshold = $opt{t} ? abs($opt{t}) : 0;
    #we don't have a potential cell yet, set a bogus signal level
    $potential_cell{signal_level} = 10000;
    if (! %current_cell){
        #set a bogus MAC address
        $current_cell{mac_address} = "xx:xx:xx:xx:xx:xx";
    }
    foreach $cell (@cells_scanned) {
        if ($cell->{mac_address} eq $current_cell{mac_address}){
            # updates current cell's signal level
            $current_cell{signal_level} = $cell->{signal_level};
        }
    }
    foreach $cell (@cells_scanned) {
        $cell_signal_level = $cell->{signal_level};
        $cell_mac_address = $cell->{mac_address};
        $potential_cell_signal_level =
        $potential_cell{signal_level};
        # figures out if this is a valid cell with a better signal
        if ( abs($cell_signal_level) <
(abs($potential_cell_signal_level) – $threshold) && ($opt{e} ? ($cell->{essid} eq $opt{e}) : 1) && ($cell_mac_address
ne "00:00:00:00:00:00")){
            while (($key, $value) = each %$cell) {
                $potential_cell{$key} = $value;
            }
        }
    }
    unless ($potential_cell{mac_address}){
        print "* No valid cells to connect\n" if $opt{v};
        return 0;
    }
    if ($current_cell{mac_address} ne $potential_cell{mac_address}){
        %current_cell = %potential_cell;
        print. "* Cell", $current_cell{cell_number}, " is better!\n"
if $opt{v};
        $mac_address = $current_cell{mac_address};
        return $mac_address;
    } else {
        print "* I'm already on the best cell (",
$current_cell{mac_address}, "); skipping hand-off. \n" if $opt{v};
        return 0;
    }
}
update the arp table with the new MAC address
```

-continued

```
expects argument consisting of a single MAC address
sub update_arp( ){
    my $mac_address = $_[0];
    print $mac_address, "\n" if $opt{d};
    # we don't need to switch cells now
    return if $mac_address eq 0;
    # tell iwconfig to switch over to the new cell
    print "--> Switching to Cell $current_cell{cell_number}; MAC $mac_address \n" if $opt{v};
    system "iwconfig ath0 ap $mac_address";
#   print "-->Changing ESSID to $current_cell{essid} \n" if $opt{v};
#   system "iwconfig ath0 essid $current_cell{essid}";
    system "iwconfig ath0" if $opt{a};
}
&init ( );
&daemon( ) if $opt{b};
my $sleep_value = $opt{s} ? abs($opt{s}) : 0;
while( ){
    &update_arp( &strongest_signal( &scan_cells( ) ) );
    sleep($sleep_value);
}
```

This software runs on a computer that includes a server 42 and a mobile internet switching controller 44 within the handoff/IP mobility management center 40. In use this software allows each mobile unit 50 connected anywhere on the network 10 to identify intelligent base stations 20 within range of the mobile unit 50 and to determine which intelligent base station 50 offers the best connection based a user defined combination of signal strength and saturation of signal. The mobile unit scans the spectrum looking for ESSID broadcast by the intelligent base stations 20 on the network. As a mobile unit 50 moves between intelligent base stations 20, the signal strength and saturation change as shown in FIGS. 2 and 3. When the user defined combination of signal strength and saturation indicate that a second intelligent base station 20 will provide either better connectivity, or will allow the network to handle other traffic more efficiently, the handoff/IP mobility management center will direct second intelligent base unit 20b to connect to mobile unit 50 and will direct first intelligent base unit 20a to disconnect from mobile unit 50. When this change occurs, the mobile internet switching controller will update the arp cache on all intelligent base stations on the network to reflect the correct routing to the mobile unit 50.

When a new connection forms the intelligent base station 20 acquiring the connection with the mobile unit 50 broadcasts a signal to all other intelligent base stations 20 announcing that I have a new device on the network IP address xxx.xxx.xxx.xxx. MAC address using conventional wireless routing such as OLSR.

What is claimed is:

1. A network comprising:
at least two intelligent base stations, each intelligent base station having a unique ESSID and a unique MAC address;
at least one mobile device adapted to communicate with said intelligent base stations, each mobile device having a unique MAC address; and
means for controlling the communications between said intelligent base stations and said mobile devices, wherein said means for controlling communications between said intelligent base stations and said mobile devices comprises:
means for transmitting routing information including a MAC address from said mobile device to said intelligent base station, and
means for transmitting routing information from any one of said at least one intelligent base station to each other said at least one intelligent base station on the network, wherein said means for controlling communications between said intelligent base stations and said mobile devices includes software for performing the following steps:
determining the signal strength of a signal from each intelligent base station in the network at a mobile device and identifying the intelligent base station having the strongest signal at the mobile device;
determining the saturation of the signal of each intelligent base station in communication with said mobile device;
determining the preferred connection between said mobile device and one of said intelligent base stations based on the signal strength of the signal from the intelligent base station and the saturation of the intelligent base station;
updating the address resolution protocol cache and broadcasting the routing information to each intelligent base station in the network;
scanning available signals from intelligent base stations within the network to determine whether the signal strength and saturation of the signals from a different intelligent base station have changed to make the second intelligent base station the preferred connection;
connecting to the second intelligent base station; and
updating the address resolution protocol cache and IP broadcasting the routing information to each intelligent base station on the network.

2. A network according to claim 1 wherein said mobile device is a server for a subnetwork.

3. A network according to claim 1 where said at least one mobile device includes a computer.

4. A network according to claim 1 where said at least one mobile device includes a cellular telephone.

5. A network according to claim 1 further comprising a plurality of mobile devices.

6. A network according to claim 1 further comprising a plurality of intelligent base stations.

7. A computer network according to claim 1 wherein said mobile devices further comprise:
means for determining the signal strength of a signal from said at least one intelligent base station, and
means for comparing the signal strength of a signal from said at least one intelligent base station.

8. A network according to claim 1 wherein said means for transmitting routing information from said mobile device to said intelligent base station includes the step of communicating the MAC of the mobile device to the intelligent base station.

9. A method for controlling a wireless network comprising:
determining a signal strength of a signal from each intelligent base station in the wireless network at a mobile device;
identifying the intelligent base station having the strongest signal at the mobile device;
determining a saturation of the signal of each intelligent base station in communication with the mobile device;
determining a preferred connection between the mobile device and one of the intelligent base stations based upon a signal strength of the signal from the intelligent base station and a saturation of the intelligent base station;
updating an address resolution protocol cache;
broadcasting routing information to each intelligent base station in the network;
scanning available signals from intelligent base stations within the network to determine whether a signal strength and a saturation of signals from a different intelligent base station have changed to make the second intelligent base station the preferred connection;
connecting to the second intelligent base station;
updating an address resolution protocol cache; and
IP broadcasting the routing information to each intelligent base station on the network.

10. A method for controlling a wireless network which includes one or more intelligent base stations and one or more mobile devices, the method comprising:
establishing a connection between a first one of the one or more mobile devices and a first one of the one or more intelligent base stations wherein the connection is established based upon a signal strength of a signal between the first one of the one or more intelligent base stations and the first one of the one or more mobile devices and the saturation of the first one of the one or more intelligent base stations compared with a saturation of other ones of the one or more intelligent base stations;
updating an address resolution protocol cache; and
broadcasting routing information to each intelligent base station in the network;
monitoring signal strength and a saturation of the one or more intelligent base stations to determine a change in signal strength and saturation of any of the one or more intelligent base stations with respect to the first one of the one or more mobile devices;
in response to a signal strength and saturation of a second, different intelligent base station changing, establishing a connection between the first mobile device and the second, different intelligent base station;
updating the address resolution protocol cache; and
broadcasting the routing information to each intelligent base station in the network.

11. The method of claim 10 wherein broadcasting the routing information to each intelligent base station on the network comprises IP broadcasting the routing information to each intelligent base station on the network.

12. The method of claim 10 wherein establishing a connection comprises:
determining a signal strength of a signal from each of the one or more intelligent base stations in the wireless network to a first one of the one or more mobile devices;
identifying an intelligent base station having the strongest signal at the first one of the one or more mobile devices; and
determining a saturation level of a signal from each intelligent base station in communication with the first one of the one or more mobile devices.

13. The method of claim 12 wherein determining whether a signal strength and saturation of signals from each of the one or more intelligent base station have changed comprises evaluating available signals from the one or more intelligent base stations within the network.

14. The method of claim 13 wherein evaluating available signals from the one or more intelligent base stations within the network includes scanning available signals from the one or more intelligent base stations within the network.

15. The method of claim 12 wherein determining a signal strength of a signal from each of the one or more intelligent base stations in the wireless network comprises determining, in at least one of the one or more mobile devices, a signal strength of a signal from each of the one or more intelligent base stations in the wireless network.

16. The method of claim 12 wherein identifying an intelligent base station having the strongest signal comprises, identifying, at each of the one or more mobile devices, an intelligent base station having the strongest signal.

* * * * *